United States Patent
Lin (10) Patent No.: US 8,767,088 B2
(45) Date of Patent: Jul. 1, 2014

(54) WHITE BALANCING METHOD AND IMAGE CAPTURING DEVICE

(71) Applicant: Hon Hai Precision Industry Co., Ltd., New Taipei (TW)

(72) Inventor: Kuo-Hung Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/726,665

(22) Filed: Dec. 26, 2012

(65) Prior Publication Data

US 2014/0078340 A1 Mar. 20, 2014

(30) Foreign Application Priority Data

Sep. 14, 2012 (TW) .............................. 101133594 A (51) Int. Cl.
*H04N 9/75* (2006.01)
*H04N 5/228* (2006.01)

(52) U.S. Cl.
USPC ..................... 348/223.1; 348/222.1; 348/277; 348/280

(58) Field of Classification Search
None
See application file for complete search history.

(56) References Cited

U.S. PATENT DOCUMENTS

| | | | |
|---|---|---|---|
| 5,555,022 A * | 9/1996 | Haruki et al. | 348/223.1 |
| 6,958,773 B1 * | 10/2005 | Sato | 348/223.1 |
| 2003/0228033 A1 * | 12/2003 | Daniel et al. | 382/104 |
| 2006/0071899 A1 * | 4/2006 | Chang et al. | 345/102 |
| 2006/0274376 A1 * | 12/2006 | Bailey et al. | 358/3.26 |
| 2008/0226189 A1 * | 9/2008 | Connell | 382/255 |
| 2009/0091661 A1 * | 4/2009 | Wu et al. | 348/687 |
| 2009/0285283 A1 * | 11/2009 | Gao et al. | 375/240.08 |

* cited by examiner

*Primary Examiner* — Hung Lam
(74) *Attorney, Agent, or Firm* — Novak Druce Connolly Bove + Quigg LLP (57) ABSTRACT

A white balancing method includes capturing an original image with red (R), green (G) and blue (B) color channels; computing and converting the R, G and B color channels into original color histogram; stretching the original color histograms over the entire grayscale width from 0 to 255 values; and adjusting a color of the original image based on the stretched color histograms to obtain a white balanced image. In the computing and converting the original color histograms, a sampling length follows a formula of $span_m = \min\{(2^h, H), (2^w, W)\}$, wherein $h=[\log_2 H]+1$, $w=[\log_2 W]+1$, H represents a height of the original image, W represents a width of the original image, [ ] is the Gaussian symbol, ( ) is greatest common divisor function, and min{ } means selecting the minimum value. An image capturing device using the white balancing method is also provided.

6 Claims, 9 Drawing Sheets

WHITE BALANCING METHOD AND IMAGE CAPTURING DEVICE

BACKGROUND

1. Technical Field

The present disclosure relates to white balance techniques, and particularly to a white balancing method and an image capturing device using the white balancing method.

2. Description of Related Art

Human eyes automatically adapt to each new environment, such that the same colors for each object can be recognized even under different light sources. However, image capturing devices don't have such a function, such that white balancing is needed for adjusting colors of an image.

A color histogram stretching (CHS) has been proposed for white balancing. In the CHS, color channels are computed and made into original color histograms, then the original color histograms are stretched over an entire width of the grayscale, thus increasing a contrast of the image, and finally the color of the image is adjusted based on the stretched color histograms. However, in the CHS, a sampling length for computing the color channels is proposed at 2 unit, which making the CHS a very time-consuming process in the white balancing.

What is needed, therefore, is a white balancing method and image capturing device using same, which can overcome the above shortcomings.

BRIEF DESCRIPTION OF THE DRAWINGS

Many aspects of the white balancing method and image capturing device can be better understood with reference to the following drawings. The components in the drawings are not necessarily drawn to scale, the emphasis instead being placed upon clearly illustrating the principles of the present white balancing method and image capturing device. Moreover, in the drawings, like reference numerals designate corresponding parts throughout the several views.

DETAILED DESCRIPTION

Embodiments of the present white balancing method and image capturing device will be described with reference to the drawings.

Referring to FIGS. 1 to 8, an image white balancing method 100 includes the following steps.

Figure 8:
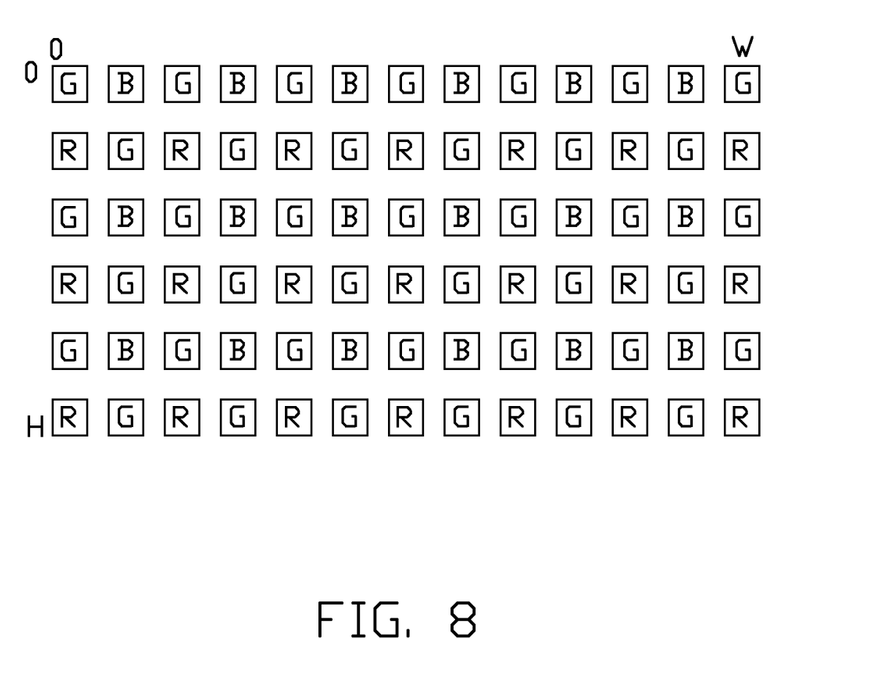
FIG. 8 is a schematic view of an original image represented by R, G and B color channels.

Step S1: an original image is provided by a digital image capturing device. The original image includes a plurality of pixels, and each pixel is composed of red (R), green (G) and blue (B) sub-pixels. Each sub-pixel includes at least one color channel. The original image represented by R, G and B color channels is as shown in FIG. 8.

Figure 1:
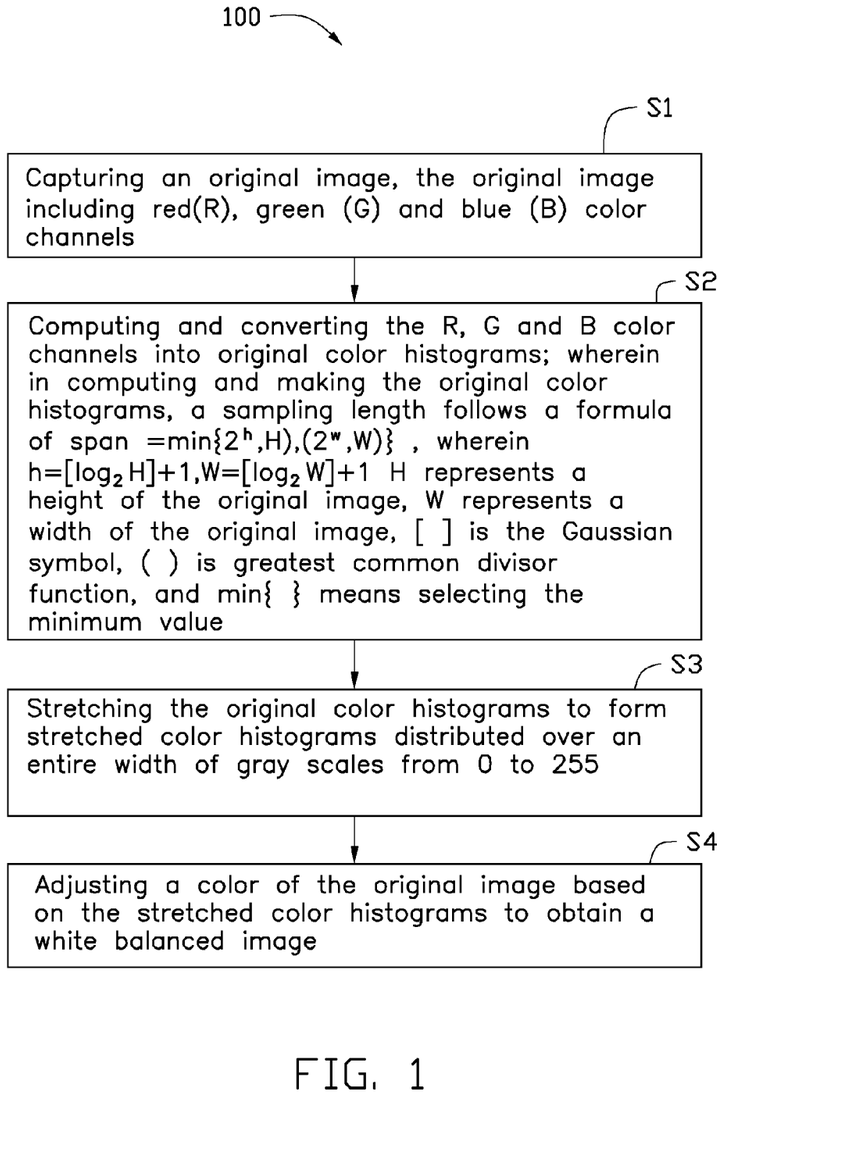
FIG. 1 is a flow chart of a white balancing method in accordance with a first embodiment.
Figure 2:
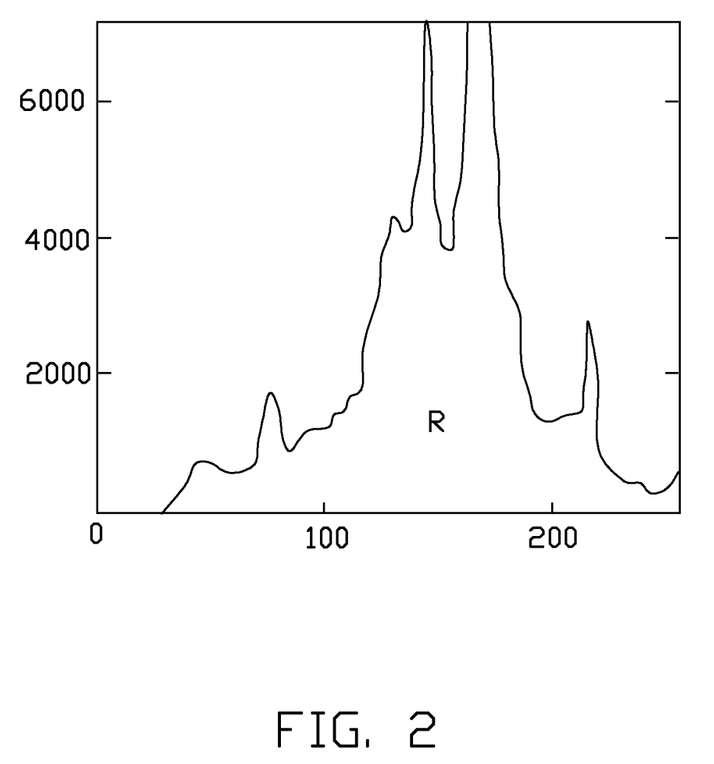
FIGS. 2-4 are original color histograms of R, G, and B color channels.
Figure 3:
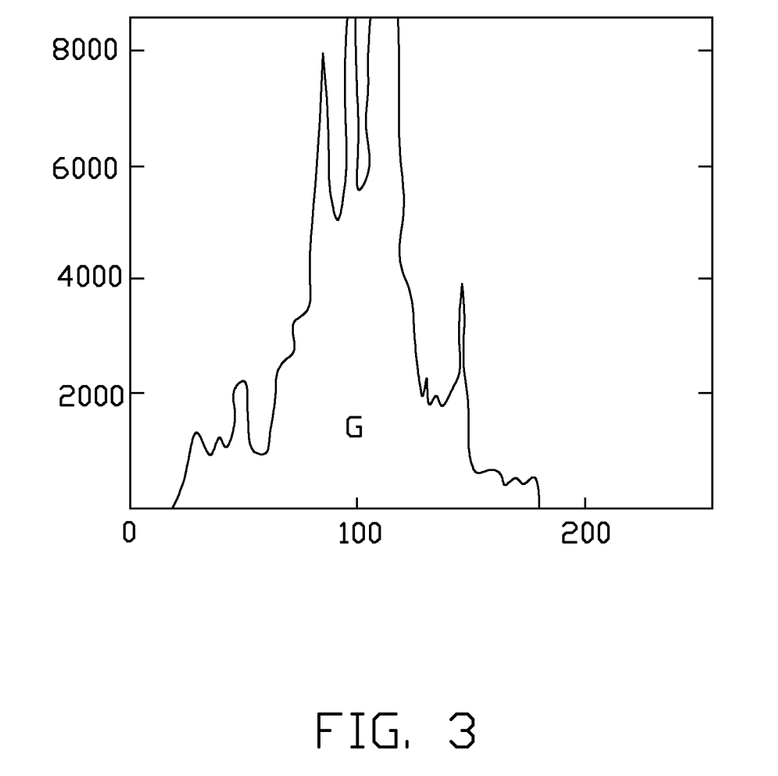
Figure 4:
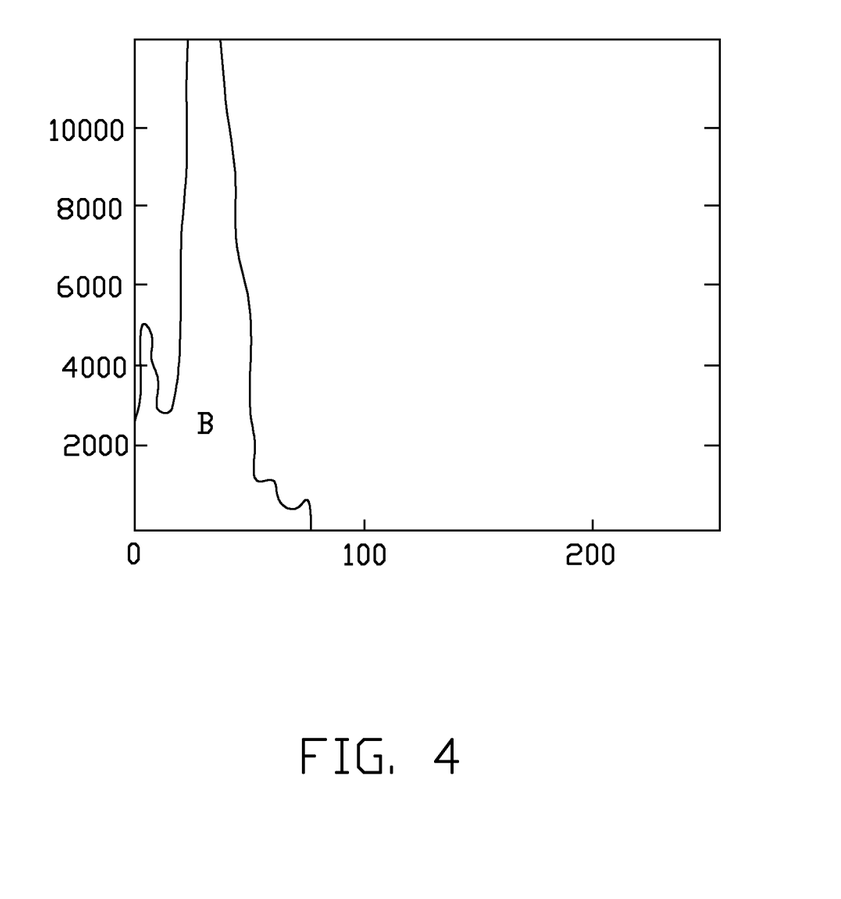

Step S2: as shown in FIGS. 2-4, the R, G, and B color channels are computed and converted into original color histograms. In the drawings, each horizontal ordinate represent a grayscale including 0 to 255 values, and each vertical ordinate represents pixel appearance frequency. The computing of the R, G, and B color channels is performed by a software process represented by RAW(x, y). In this process, x satisfies a formula (x=0; x<W; x=x+span), and y satisfies a formula (y=0; y<H; y=y+span), wherein H represents a height of the original image, W represents a width of the original image, and "span" represents a sampling length. In the present embodiment, the "span" follows a formula of $span_m = \min\{(2^h, H), (2^w, W)\}$, wherein $h=[\log_2 H]+1$, $w=[\log_2 W]+1$, [ ] is the Gaussian symbol, ( ) is greatest common divisor function, and min{ } means selecting the minimum value.

Figure 5:
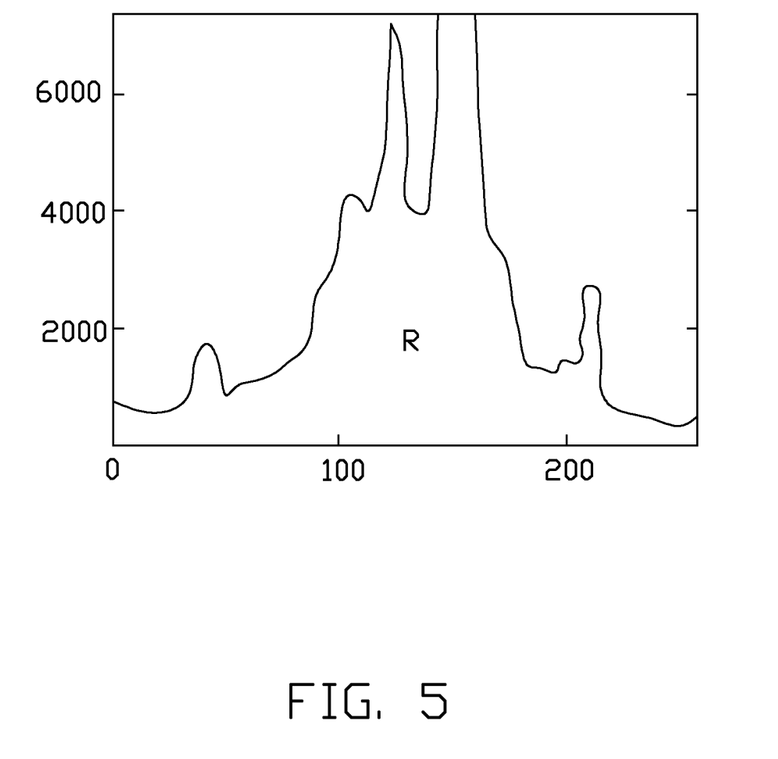
FIGS. 5-7 are stretched color histograms of R, G, and B color channels.
Figure 6:
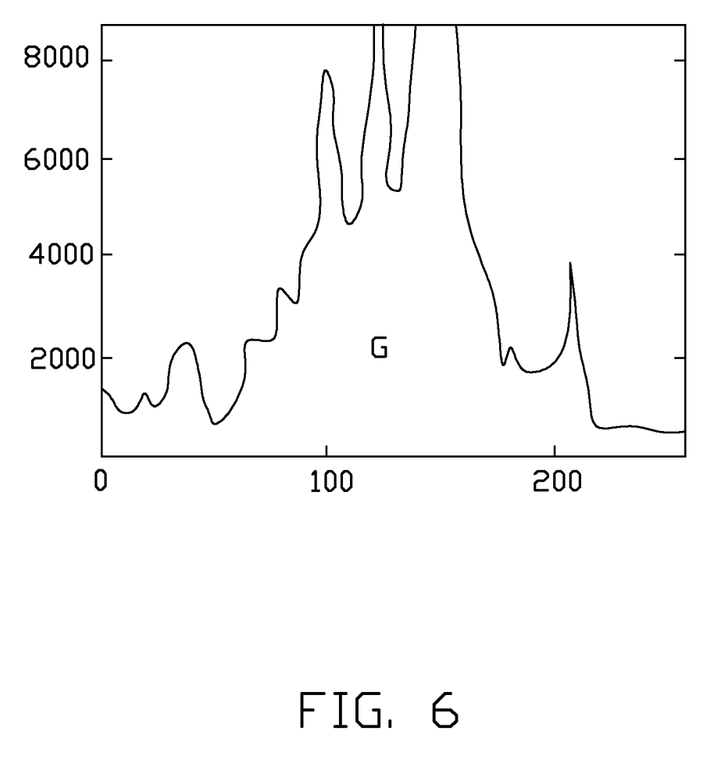
Figure 7:
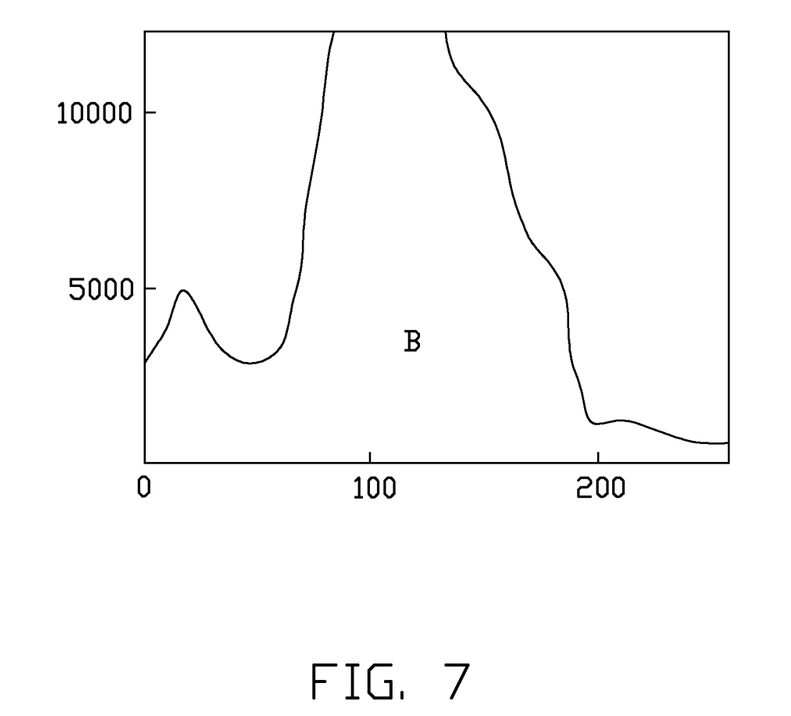

Step S3, as shown in FIGS. 5 to 7, the R, G, and B original color histograms of FIGS. 2-4 are stretched to be distributed over the entire width of the grayscale, thus increasing a contrast of the image.

Step S4, the color of the original image is adjusted based on the stretched R, G, and B color histogram to obtain a white balanced image.

In particular, in step S2, if red (R), green red (Gr), green blue (Gb) and blue (B) color channels are used in computing and converting the original color histograms, the times for computing the original image will be $$\frac{H}{span} \cdot \frac{W}{span} \cdot 4 = \frac{4H \cdot W}{span^2}.$$

In the related art method, a sampling length for the span may be 2 unit, then the conventional computing times is H·W.

In the present embodiment, the $span_m$ is proposed. According to the formula $span_m = \min\{(2^h, H), (2^w, W)\}$, $span_m$ is far greater than 2, and the times for computing the original image will be $$\frac{H}{span_m} \cdot \frac{W}{span_m} \cdot 4 = \frac{4H \cdot W}{span_m^2}.$$

As $span_m^2$ is far greater than 4, the computing times will be far less than H·W. That is, the time spent on the computing and converting the original color histograms will be decreased, and therefore a lot of time will be saved in performing the white balancing.

According to a comparison, the white balanced image using the sampling length $span_m$ appears the same as the white balanced image using the normal sampling length 2.

Figure 9:
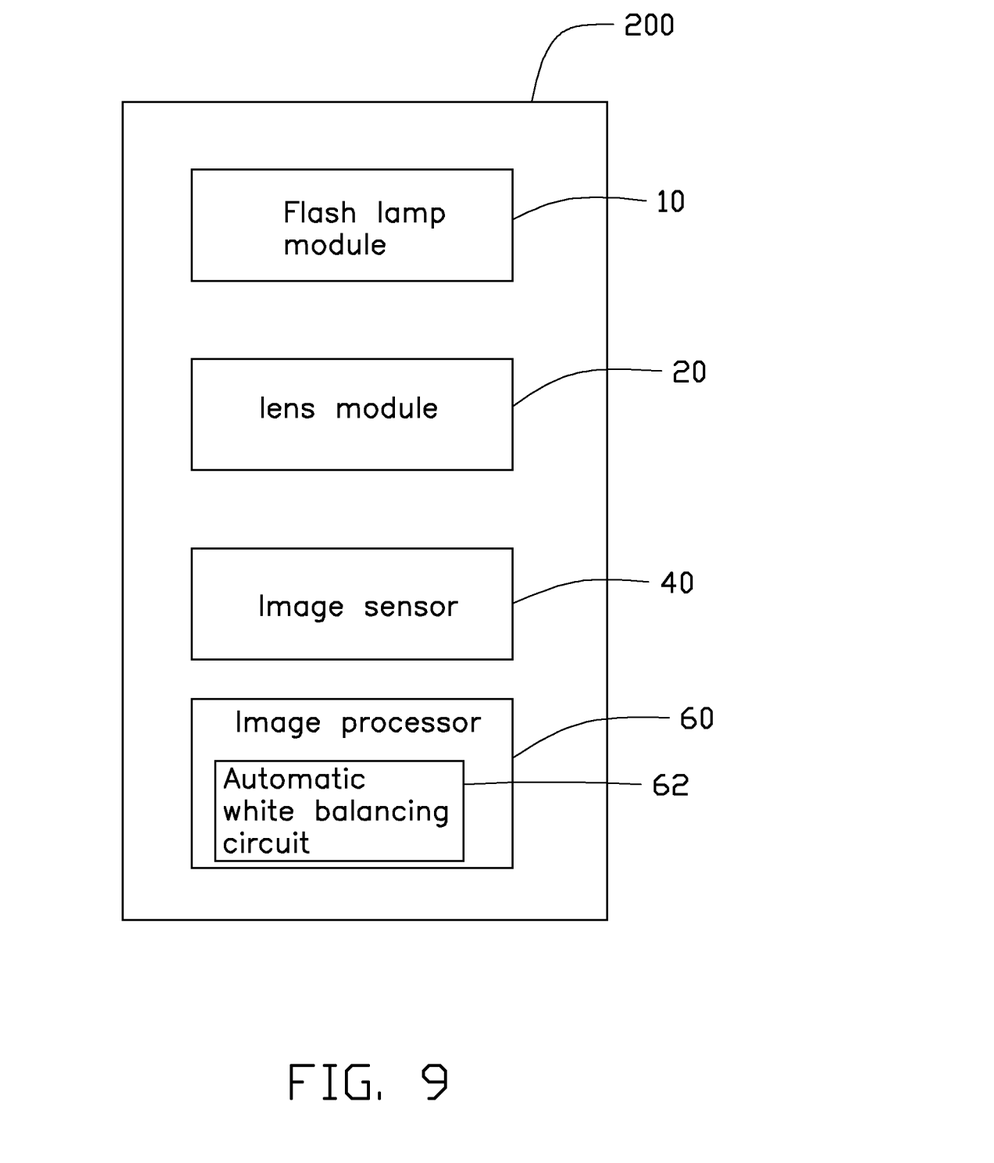
FIG. 9 is a block diagram of an image capturing device in accordance with a second embodiment.

Referring to FIG. 9, an image capturing device 200 using the white balancing method of the present embodiment includes a lens module 20, an image sensor 40 and a image processor 60. The image sensor 40 is electrically connected to the image processor 60. The lens module 20 and the image sensor 40 cooperatively capture an image, and the image processor 60 receives the image from the image sensor 40.

The image processor 60 has an automatic white balancing circuit 62 to perform the white balancing method of the present embodiment. The image capturing device 200 further includes a flash lamp module 10.

It is understood that the above-described embodiments are intended to illustrate rather than to limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A white balancing method, comprising:
capturing an original image, the original image including red (R), green (G) and blue (B) color channels;
computing and converting the R, G and B color channels into original color histograms;
stretching the original color histograms to form stretched color histograms distributed over an entire grayscale width from 0 to 255 values; and
adjusting a color of the original image based on the stretched color histograms to obtain a white balanced image;
wherein in the step of computing and converting the original color histograms, a sampling length follows a formula of $span_m=\min\{(2^h, H), (2^w, W)\}$, wherein $h=[\log_2 H]+1$, $w=[\log_2 W]+1$, H represents a height of the original image, W represents a width of the original image, [ ] is the Gaussian symbol, ( ) is greatest common divisor function, and min{ } means selecting the minimum value.

2. The white balancing method of claim 1, wherein the original color histograms is computed using a software process represented by RAW (x, y) where x satisfies a formula of (x=0; x<W; x=x+$span_m$) and y satisfies a formula of (y=0; y<H; y=y+$span_m$).

3. The white balancing method of claim 1, wherein the green channel includes green red (Gr) and green blue (Gb) sub channels.

4. The white balancing method of claim 3, wherein times of computing the R, Gr, Gb and B channels of the original image is determined according to the following expression $$\frac{H}{span_m} \cdot \frac{W}{span_m} \cdot 4 = \frac{4H \cdot W}{span_m^2}.$$

5. An image capturing device, comprising:
a lens module;
an image sensor; and
an image processor, wherein the lens module and the image sensor are configured for cooperatively forming an original image, the image processor is electrically connected to image sensor and includes an automatic white balancing circuit configured to perform the white balancing method of claim 1.

6. The image capturing device of claim 5, wherein further comprising a flash lamp module.

* * * * *